Figure 2:
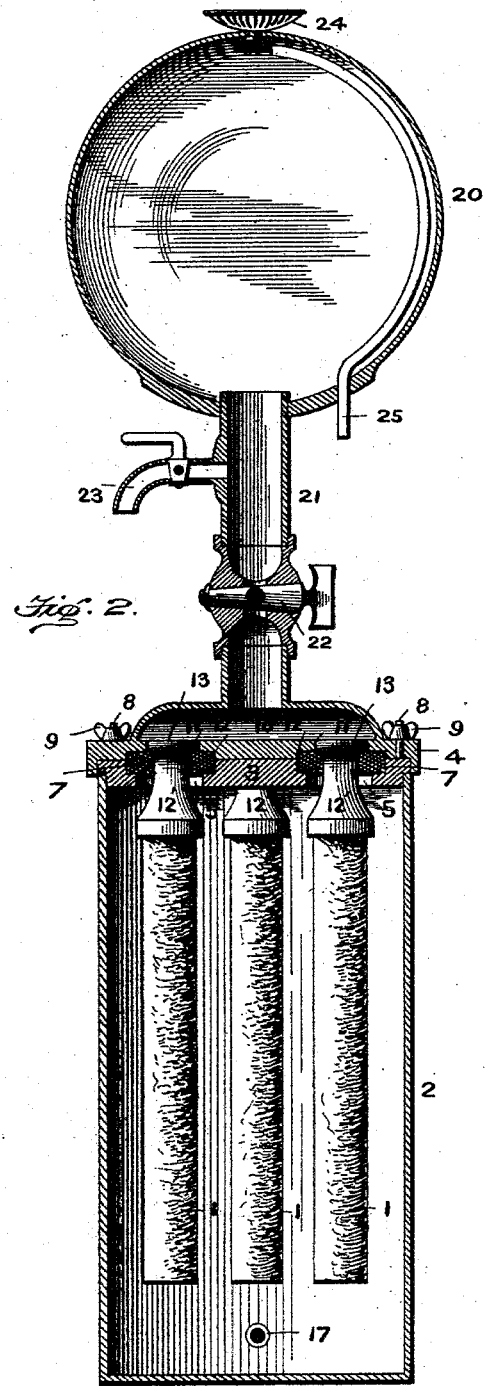

(No Model.)   2 Sheets—Sheet 1.
A. L. WILKINSON, Sr.
GERM PROOF FILTER.
No. 515,700.   Patented Feb. 27, 1894.
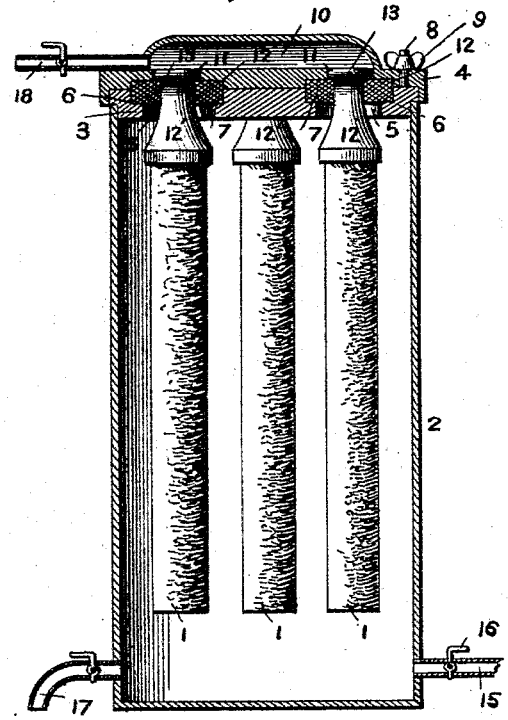
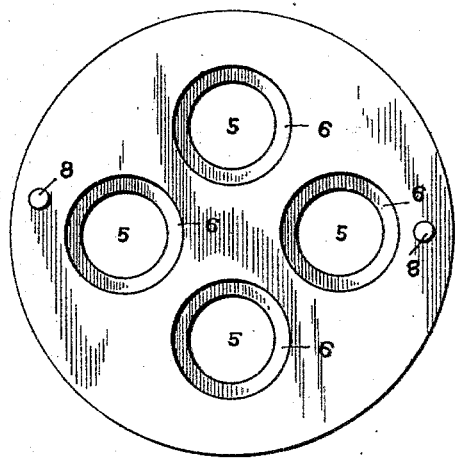
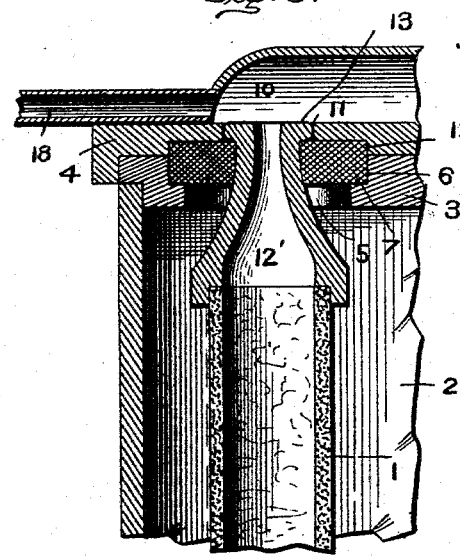
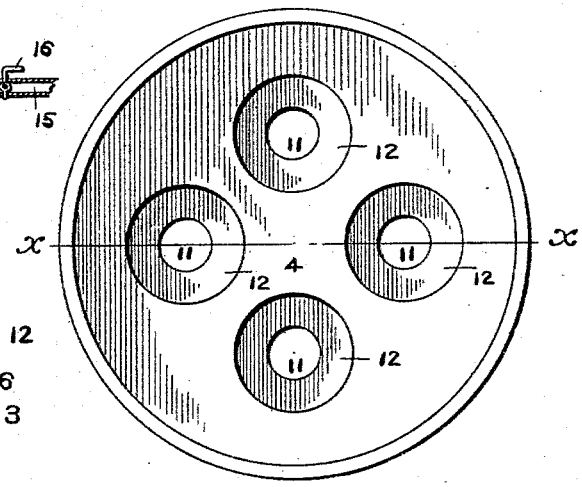
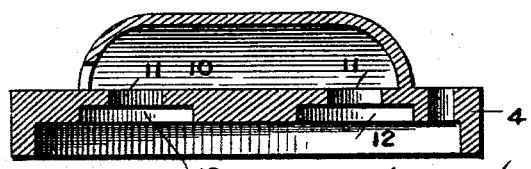
Witnesses
Wm. C. Dashiell
H. J. Bemis
Inventor
A. L. Wilkinson, Sr.
By Edson Bros.
Att'ys.

(No Model.) 2 Sheets—Sheet 2.

A. L. WILKINSON, Sr.
GERM PROOF FILTER.

No. 515,700. Patented Feb. 27, 1894.

Witnesses:

Inventor
A. L. Wilkinson, Sr.
By Edson Bros,
Attys.

UNITED STATES PATENT OFFICE.

ALGERNON L. WILKINSON, SR., OF RICHMOND, VIRGINIA.

GERM-PROOF FILTER.

SPECIFICATION forming part of Letters Patent No. 515,700, dated February 27, 1894.

Application filed May 15, 1893. Serial No. 474,264. (No model.)

*To all whom it may concern:*

Be it known that I, ALGERNON L. WILKINSON, Sr., a citizen of the United States, residing at Richmond, in the county of Henrico and State of Virginia, have invented certain new and useful Improvements in Germ-Proof Filters; and I do hereby declare the following to be a full, clear, and exact description of the invention, such as will enable others skilled in the art to which it appertains to make and use the same.

My present invention is an improvement in filters of that class which employ a porous filtering tube through which the water or liquid is percolated to remove impurities which are deposited or accumulate on the walls of the porous tube or surface while the purified or filtered water is discharged in a wholesome condition into a receiver separate from the chamber containing the porous filtering body.

The present improvements relate more particularly to the means for sustaining the porous filtering bodies or tubes within their inclosing shell and for discharging the filtered wholesome water from said porous bodies or tubes into the receiver, said devices being specially constructed with a view to permitting the filtering bodies or tubes to be quickly and easily removed without strain to the parts for the purpose of easily and quickly cleansing the tube or tubes from the sediment that accumulates on its surface.

With these ends in view, I provide a suspension plate at the top or upper end of the vessel or shell that contains the filtering tubes, and in this suspension plate I form a series of openings of such diameter as to permit the filtering tubes to be readily moved or passed through the plates. Around each opening in the suspension plate is formed a ledge or seat on which rests a compressible disk-like gasket which fits snugly around a tapered neck of the nipple of the upper end of each filtering tube, whereby the gasket is sustained by the suspension plate and the gasket serves to suspend the filtering tube from the suspension plate while at the same time the filtering tube, with the gasket, can be lifted out through the opening in the suspension plate for cleaning the filtering tube. Over this suspension plate is fitted a cap that is forced or clamped tightly down upon the suspension plate, and in the lower face of this cap is provided a series of sockets that correspond to the openings in the filtering plate and which are designed to partially receive the compressible gaskets which are thus fitted or held between the opposing faces of the plate and cap. This cap is further provided with smaller openings which lie centrally within and concentric with the larger sockets therein, and the central openings are of such diameter as to receive the upper open ends of the nipples on the filtering tubes. These central openings in the cap all communicate with a chamber or passage provided in the cap above the openings or sockets, and this chamber or passage receives the filtered wholesome water from the series of filtering tubes, and from said chamber or passage leads a pipe or faucet to discharge the filtered water to a suitable vessel. The cap is clamped securely down upon the suspension plate and the gaskets are compressed between said cap and plate to form tight joints around the tubes and between the cap and plate to prevent the unwholesome water in the primary vessel or shell from passing into the chamber or passage of the cap; and this cap can be readily detached to permit of access to the filtering tubes.

The invention further consists in the construction and combination of parts as will be hereinafter more fully described and claimed.

I have illustrated the preferred embodiment of my invention in the accompanying drawings, forming a part of this specification, in which—

Figure 7:
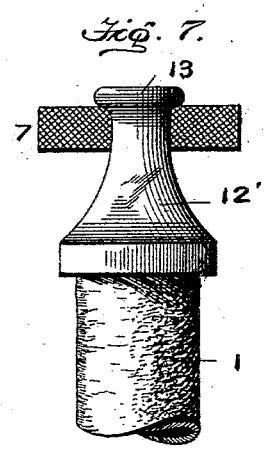

Figure 1 is a vertical sectional view through a filter embodying my invention. Fig. 2 is a similar sectional view of the filter having its cap surmounted by a receiver for the filtered water. Fig. 3 is an enlarged detail sectional view through one of the tubes, the suspension plate and cap, to more clearly show the connection and arrangement of parts. Fig. 4 is a detail view of the suspension plate. Fig. 5 is an inverted view of the cap, and Fig. 6 is a sectional view thereof, on the line $x$—$x$ of Fig. 5. Fig. 7 is a detail view of a part of the filtering tube and the elastic or compressible gasket.

Like numerals of reference denote corresponding parts in all the figures of the drawings, referring to which—

1 denotes a series of filtering tubes and 2 the shell or receptacle in which said filtering tubes are housed and suspended by the means forming the principal features of my present improvements. Any desired number of filtering tubes may be employed, although in the preferred embodiment of my invention, I have illustrated a series of the tubes 1, but it will be understood that I can employ a single tube, or two, three or more tubes, as may be deemed most expedient; and the shell or receptacle 2 may be made cylindrical, square or of any other preferred shape. This shell or receptacle is tightly closed at its upper end by the suspension plate 3 and the cap 4, the former plate 3, being soldered or otherwise securely sealed or united to the top edges of the shell 2 while the cap 4 is clamped tightly, but detachably, to the suspension plate, for ready access to the filtering tubes when it is desired to remove and cleanse them. This suspension plate 3 is provided with a series of openings 5 of such diameter that the filtering tubes can easily pass through the same, and each of these openings 5 is surrounded by a ledge or shoulder 6 that forms a seat for the compressible gasket or washer 7.

The cap 4 is constructed to fit snugly to or upon the suspension plate, and it is detachably clamped thereto by any suitable means, one embodiment of which I have illustrated in the drawings. The specific clamping means which I prefer to employ consists of the threaded studs 8 which are fixed at suitable points to the suspension plate, and the binding nuts 9 that are screwed on the threaded studs after the cap 4 is placed on the plate 3 so as to bind the cap tightly upon the plate, said studs 8 passing through suitable holes or openings provided in the cap for the reception of the threaded studs. This cap 4 is constructed to form the chamber or passage 10 in its upper part 4 containing the filtered wholesome water from the porous filtering tubes, and in the lower side or face of the cap are formed the small openings 11 and the sockets 12. These openings 11 communicate with or open directly into the chamber or passage 10 of the cap, and one opening 11 is arranged centrally within and concentric with one of the sockets 12. These sockets 12 are arranged to coincide or align with the openings 5 in the suspension plate; and in said coincident sockets and openings are fitted the compressible gaskets 7 which lie snugly between the plate 3 and cap 4 so as to be compressed between and by said parts when they are clamped together in order to secure the necessary tight joints between the plate and cap to prevent the unwholesome water from passing from the vessel 2 into the chamber or passage 10 of the cap.

Each tube 1 is made or composed of a suitable porous filtering medium or material, and it is provided with a tapered nipple 12 at its upper extremity. The head of this nipple 12 is enlarged somewhat to form the annular bead 13 and the upper side of the nipple is pierced with a hole or passage 14 forming the outlet from the filtering tube for the wholesome water therein. The nipple 12 of each filtering tube is thrust or forced through a central perforation in one of the compressible gaskets or washers, and the latter tightly clasps the nipple, around the tapered neck thereof, with sufficient friction to sustain the filtering tube within its vessel or receptacle 2; thus the tubes 1 are all suspended by the gaskets 7 from the suspension plate.

The upper extremities of the nipples 12 fit snugly in the smaller openings 11 of the cap to discharge the filtered water directly into the chamber or passage 10; and as the compressible gaskets fit tightly around the nipples, and said gaskets are compressed between the plate and cap, the unwholesome water is prevented from passing into the chamber or passage 10 and from contaminating the pure filtered water contained therein.

The cap can be detached after the binding screws have been removed and the filtering tubes (one or more) can be easily lifted out through the opening 5 in the plate 4 so that the sediment can be washed or removed from the outer surface of the filtering tube, after which the tube or tubes are replaced and the cap again clamped tightly upon the plate.

The water to be filtered is supplied to the shell or vessel 2 by the pipe 15 which has a cut-off or valve 16 and the unwholesome or foul water in the filter can be drawn off at any time through a faucet 17 attached to the vessel 2 at or near its lower end.

The pure filtered water contained in the chamber of the cap 4 can be carried away or drawn off to any suitable receiver by means of a pipe 18, as shown in Fig. 1, but in Fig. 2 of the drawings I have shown a receiver for the filtered water mounted directly upon the cap of the filter, which device I may employ in some instances. This receiver 20 I have shown in the form of a globular tank, although its shape is immaterial; and it is mounted upon a hollow pedestal or column 21 forming the passage from the water chamber 10 in the cap 4 to the bottom of the receiver or tank. This column 21 is provided with a valve 22 for cutting off communication between the tank and the cap chamber 10; and it is further provided with a faucet 23 through which the filtered water can be drawn off at any time for use.

The receiver may be surmounted by an ornamental vase 24, and it is provided with an overflow pipe 25, one open end of which pipe terminates at or near the top of the receiver, while its outer end leads outside of the receiver to enable the pipe to discharge any surplus of water from the elevated tank into a suitable vessel.

The operation and advantages of my invention will be readily understood and appreciated by those skilled in the art to which it relates from the foregoing description taken in connection with the drawings.

I am aware that changes in the form and proportion of parts and details of construction of the devices herein shown and described as an embodiment of my invention can be made without departing from the spirit or sacrificing the advantages thereof, and I therefore reserve the right to make such changes and alterations therein as fairly fall within the scope of the same.

Having thus fully described my invention, what I claim as new, and desire to secure by Letters Patent, is—

1. In a filter, substantially such as described, the suspension plate, and the detachable cap confined or clamped thereon and provided with the chamber or passage for filtered water, combined with a vessel, the compressible gasket confined between the plate and cap, and a filtering tube suspended by the gasket and having its discharge end opening directly into the chamber or passage of the cap, as and for the purpose described.

2. In a filter, substantially such as described, the combination of a suspension plate fixed to a suitable receptacle, a detachable cap clamped to said suspension plate and provided in its upper side with the chamber or passage for filtered water, the gaskets confined by and between said plate and cap, and filtering tubes suspended by said gaskets from the plate and having their nipples seated in the cap, as and for the purposes set forth.

3. In a filter, substantially such as described, the fixed suspension plate and a detachable cap clamped thereto and provided in their opposing faces with the coincident openings or sockets, said cap having a chamber or passage for filtered water and with seats or openings for the nipples of filtering tubes, combined with compressible gaskets fitted in said coincident openings and sockets of the plate and cap, and filtering tubes which have their nipples clamped by the gaskets and fitted in the seats provided therefor in the cap, as and for the purposes set forth.

4. In a filter, substantially such as described, the combination of a suspension plate fixed to a suitable receptacle and having the openings therein surrounded by the seats, the cap clamped upon said plate and provided with the chamber or passage 10 and the openings 11 and 12, the compressible gaskets fitted on the seat of the suspension plate and in the openings 11 of the cap, and the filtering tubes having their nipples clasped by the gaskets and with the upper extremities thereof seated in the openings 12 of said cap, as and for the purpose described.

In testimony whereof I affix my signature in presence of two witnesses.

ALGERNON L. WILKINSON, Sr.

Witnesses:
W. D. SELDEN,
ELLIS. ABRAM.